United States Patent
Kitagawa

(10) Patent No.: US 7,405,549 B2
(45) Date of Patent: Jul. 29, 2008

(54) SOFT START CIRCUIT, POWER SUPPLY UNIT AND ELECTRIC EQUIPMENT

(75) Inventor: Atsushi Kitagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 172 days.

(21) Appl. No.: 11/462,399

(22) Filed: Aug. 4, 2006

(65) Prior Publication Data

US 2007/0030709 A1    Feb. 8, 2007

(30) Foreign Application Priority Data

Aug. 5, 2005    (JP)    ............................. 2005-227484

(51) Int. Cl.
*G05F 1/613*    (2006.01)
*G05F 3/02*    (2006.01)

(52) U.S. Cl. .................. 323/282; 323/315; 323/901

(58) Field of Classification Search ............... 323/222, 323/223, 265, 282, 284, 285, 315, 901; 363/49
See application file for complete search history.

(56) References Cited

U.S. PATENT DOCUMENTS

| 7,088,078 B2 * | 8/2006 | Liu | 323/207 |
| 7,106,036 B1 * | 9/2006 | Collins | 323/282 |
| 7,218,080 B2 * | 5/2007 | Yang | 323/222 |
| 7,262,582 B2 * | 8/2007 | Warita et al. | 323/222 |

FOREIGN PATENT DOCUMENTS

JP    07-336999 A    12/1995

* cited by examiner

*Primary Examiner*—Gary L Laxton
(74) *Attorney, Agent, or Firm*—Keating & Bennett, LLP

(57) ABSTRACT

A soft start circuit includes a constant current source for generating a constant current, a first current mirror circuit for generating from the constant current a first mirror current, a second current mirror circuit for generating from the constant current a second mirror current smaller than the first mirror current, and a capacitor into which a difference between the first mirror current and the second mirror current is introduced, wherein a divided voltage of a charging voltage thereof is output as a soft start voltage. The soft start circuit provides a gradual soft start voltage.

14 Claims, 8 Drawing Sheets

SOFT START CIRCUIT, POWER SUPPLY UNIT AND ELECTRIC EQUIPMENT

BACKGROUND OF THE INVENTION

1. Field of the Invention

The present invention relates to a power supply unit for generating a desired output voltage from an input voltage and electric equipment including the power supply unit and, more particularly, to a soft start circuit thereof.

2. Description of the Related Art

A conventional direct current stabilized power supply unit includes an error amplifier which amplifies a voltage difference between a feedback voltage which varies depending on the output voltage and a predetermined reference voltage and has an arrangement such that switching control of an output transistor is carried out using an output signal (error voltage) of the error amplifier. More specifically, such a direct current stabilized power supply unit has an arrangement such that a PWM (Pulse Width Modulation) signal of a duty depending on a result of the comparison between the error voltage and a predetermined slope voltage is generated and the output transistor is ON/OFF controlled using the PWM signal (see, for example, JPH7-336999 filed by the applicant of the present application).

Further, the conventional direct current stabilized power supply unit mentioned above includes a soft start circuit for preventing large current from flowing into the load when supplying power (excessively low output voltage). More specifically, the soft start circuit has such an arrangement that, as shown in FIG. 8, a soft start voltage Vss is generated that gradually rises after supplying power by introducing a predetermined constant current i1 (e.g., 100 nA) from a constant current source 11 to a capacitor Css, and PWM comparator PCMP generates a PWM signal of a duty depending on a result of the comparison between the lower of error voltage Verr or soft start voltage Vss and a predetermined slope voltage Vslp.

Certainly, with the conventional direct current stabilized power supply unit as mentioned above, a large current flowing into the load when supplying power can be prevented by using a soft start circuit.

However, with the conventional soft start circuit as mentioned above, it is difficult to cause the soft start voltage Vss to rise gradually due to the following reasons.

In order to attain a gradual rising of the soft start voltage Vss, the capacity of the capacitor Css should be increased or the constant current i1 flowing therein should be made small.

However, an increase in capacity of the capacitor Css needs a large occupied area and this is disadvantageous in promoting integration into LSI. For example, if one desires to reduce the rise of the soft start voltage Vss to $1/10$ of the current state, the capacity (occupied area) of the capacitor Css should be expanded by approximately ten times, which suggests integration into LSI is no longer practical, and generally, there is no way to include such a large capacity capacitor Css unless it is mounted externally.

Furthermore, conventionally, a minute electric current i1 of approximately 100 nA is fed to the capacitor Css, and if this current should be reduced further, it poses a problem as how to maintain generation accuracy thereof. When output current of the constant current source I1 is merely reduced, maintaining generation accuracy of the constant current i1 is difficult, and in the worst case, there may be a possibility that a device is not started up at all.

SUMMARY OF THE INVENTION

In order to overcome the above-mentioned problems, preferred embodiments of the present invention provide a soft start circuit capable of providing a more gradual soft start voltage without an increased occupied area and deterioration of the accuracy, and a power supply unit and electric equipment including such a novel soft start circuit.

A soft start circuit according to a first preferred embodiment of the present invention includes a first constant current source for generating a first constant current, a second constant current source for generating a second constant current that is smaller than the first constant current, and a capacitor into which an electric current that is the difference between the second constant current and the first constant current is introduced, wherein a charging voltage appearing at one end of the capacitor is output as a comparison voltage for a soft start.

A soft start circuit according to a second preferred embodiment of the present invention includes a constant current source for generating a predetermined constant current, a first mirror current circuit for generating from the constant current a first mirror current, a second mirror current circuit for generating from the constant current a second mirror current that is smaller than the first mirror current, and a capacitor into which an electric current that is the difference between the second mirror current and the first mirror current is introduced, wherein a charging voltage appearing at one end of the capacitor is output as a comparison voltage for a soft start.

A soft start circuit according to a third preferred embodiment includes the soft start circuit of the first or second preferred embodiment and further includes a voltage dividing circuit for dividing a charging voltage of the capacitor, and preferably has an arrangement such that a divided voltage generated by the voltage dividing circuit is output as a comparison voltage for the soft start.

A soft start circuit according to a fourth preferred embodiment includes the soft start circuit of the third preferred embodiment and further includes a comparator for comparing a charging voltage of the capacitor with a predetermined threshold voltage, a switch element which is inserted between a power supply line and an output terminal of the voltage dividing circuit and is ON/OFF controlled according to an output logic of the comparator, and preferably has an arrangement such that the switch element is shifted to an ON state when a charging voltage of the capacitor exceeds the predetermined threshold voltage.

A soft start circuit according to a fifth preferred embodiment includes the soft start circuit according to any one of the first to fourth preferred embodiments and further includes an external terminal connected to one end of the capacitor.

A power supply unit according to a sixth preferred embodiment of the present invention includes an output transistor for generating from an input voltage an output voltage according to an ON/OFF control thereof, an error amplifier for generating an error voltage by amplifying a difference between a feedback voltage depending on the output voltage and a predetermined reference voltage, a soft start circuit for generating a comparison voltage for a soft start which rises after supplying power, a PWM comparator for generating a PWM signal of a duty depending on a result of the comparison between the lower of the error voltage or the comparison voltage and a predetermined slope voltage, a controller arranged to execute ON/OFF control of the output transistor using the PWM signal, and an arrangement having a soft start circuit according to any one of the first to fifth preferred embodiments.

A power supply unit according a seventh preferred embodiment includes the power supply unit according to the sixth preferred embodiment and further includes an inductor in which one end is connected to an applied end of the input voltage and the other end is connected to one end of the output transistor, a diode in which an anode is connected to one end of the output transistor and a cathode is connected to the output voltage taking-out end, a capacitor in which one end is connected to the output voltage taking-out end and the other end is connected to an applied end of the reference voltage, and preferably has an arrangement such that the output voltage is generated by stepping-up the input voltage.

An electric equipment according to an eighth preferred embodiment of the present invention includes a battery which serves as a power supply of the equipment, a power supply unit which is an output conversion for the battery, wherein the power supply unit is the power supply unit according to the sixth or seventh preferred embodiment.

According to the various preferred embodiments of the present invention, it is possible to provide a soft start circuit that is capable of providing a more gradual rise of the soft start without an increased occupied area and deterioration of the accuracy, and to provide a power supply unit and electric equipment using such a soft start circuit.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The following description explains a case where the present invention is applied to a DC/DC converter mounted to a cellular phone unit for generating a driving voltage for each of the terminals of, for example, a CCD (Charge Coupled Device) camera, by converting an output voltage of the battery.

Figure 1:
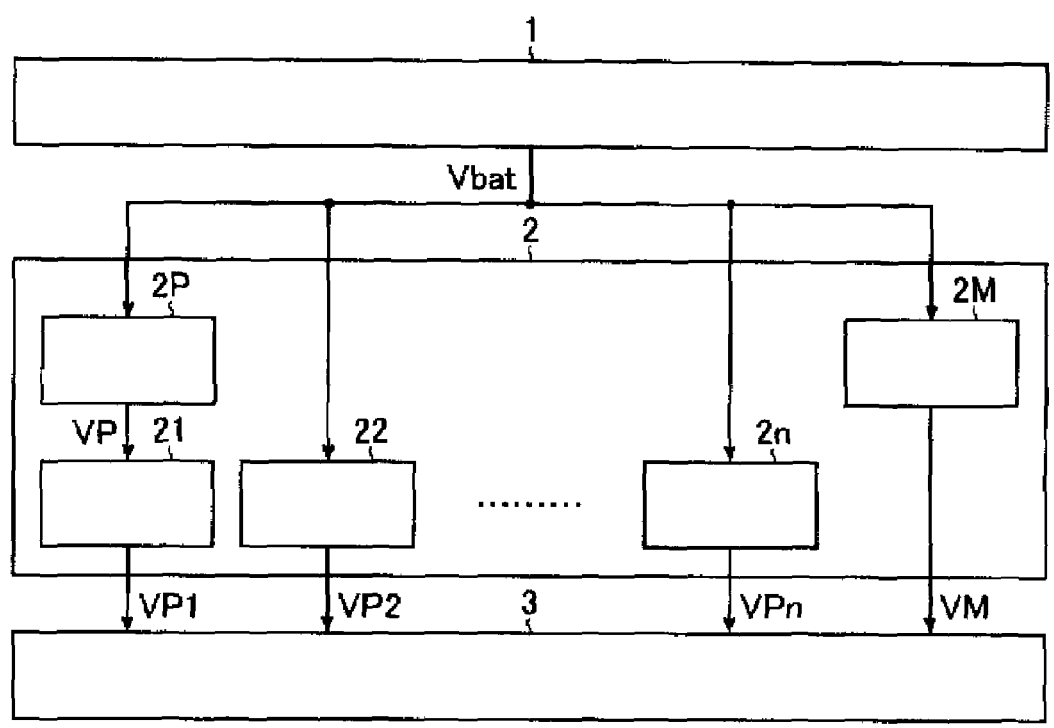
FIG. 1 is a block diagram showing a cellular phone unit according to a first preferred embodiment of the present invention.

FIG. 1 is a block diagram showing a cellular phone unit according to a first preferred embodiment of the present invention, in particular a power unit system for a CCD camera, for example. As shown in the drawing, the cellular phone unit of the present preferred embodiment includes a battery 1 which serves as the power supply unit of a device, a system regulator 2 which is an output conversion of the battery 1, and a CCD camera module 3 for taking pictures with the cellular phone unit. Although not shown in FIG. 1, the cellular phone unit of the present preferred embodiment includes, in addition to the above mentioned components, a transmission/reception circuit unit, a speaker unit, a microphone unit, a display unit, an operation unit, and a memory unit, or the like.

The CCD camera module 3 needs a plurality of driving voltages (e.g., +15.0 V, +3.0 V, +1.8 V, −8.0 V) for driving CCD elements and a DSP (Digital Signal Processor) within the module or I/O (input/output) circuits thereof. For this reason, the system regulator 2 has a positive voltage step-up circuit 2P for stepping-up battery voltage Vbat (e.g. 3.0 V) to a predetermined positive increased voltage VP (e.g. +18 V) and a negative voltage step-up circuit 2M for negatively stepping-up battery voltage Vbat to a predetermined negative step-up voltage VM (e.g. −8 V). The system regulator 2 further includes first to n-th regulator circuits (series regulator circuits) 21 to 2n, for generating a plurality of positive voltages VP1 to VPn from battery voltage Vbat or step-up voltage VP. Positive voltages VP1 to VPn and negative step-up voltage VM are all supplied to the CCD camera module 3.

Figure 2:
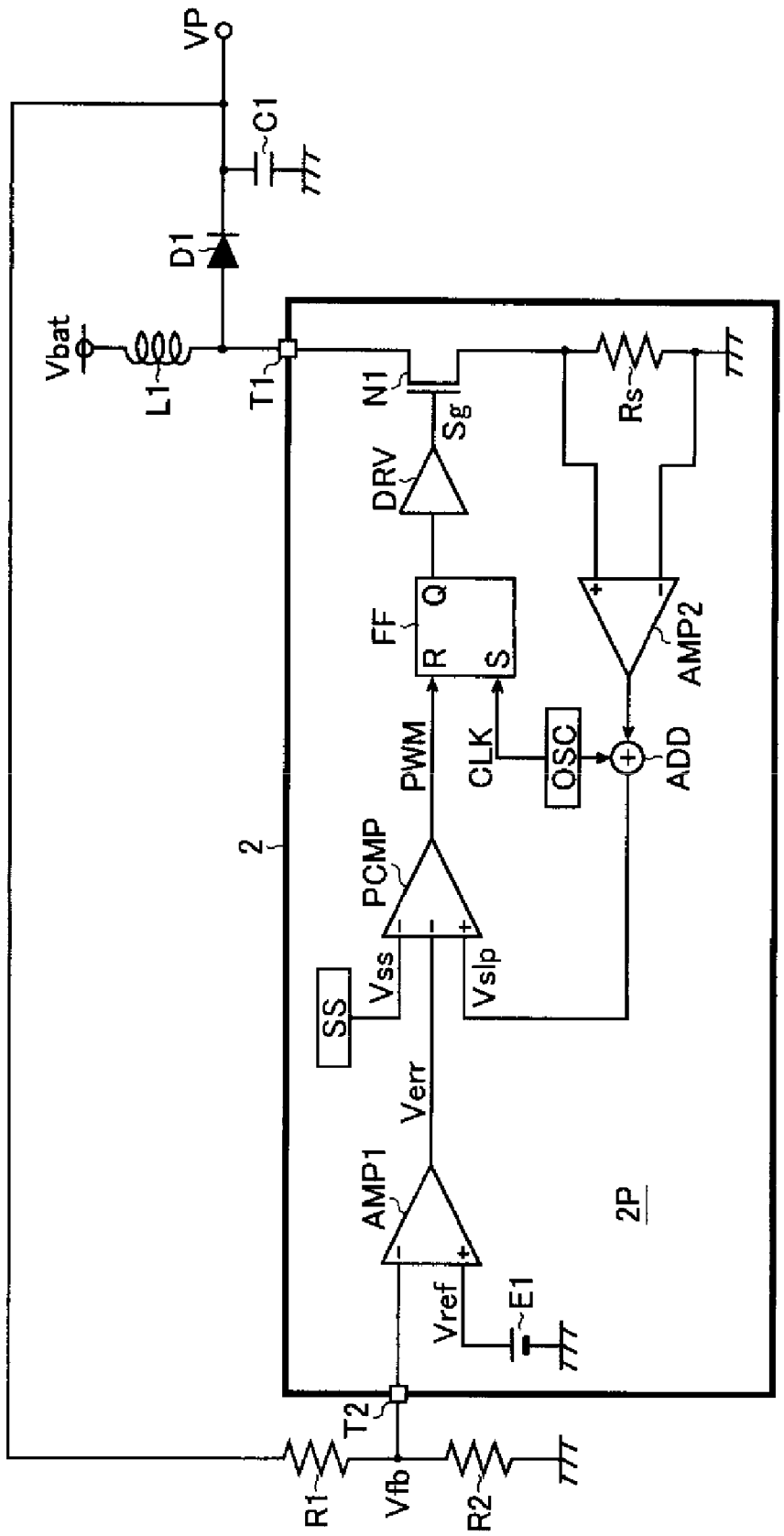
FIG. 2 is a circuit diagram showing one example of an arrangement of a positive voltage step-up circuit.

FIG. 2 is a circuit diagram (partially including a block diagram) showing a power unit circuit of a peak current mode method as one example of an arrangement of the positive voltage step-up circuit 2P. As shown in FIG. 2, the positive voltage step-up circuit 2P of the present preferred embodiment includes an N-channel field effect transistor N1, a sense resistance Rs, an error amplifier AMP1, an amplifier AMP2, a DC voltage supply E1, a soft start circuit SS, an oscillator OSC, an adder ADD, a PWM comparator PCMP, a reset preference type SR flip-flop FF, a driver circuit (buffer circuit) DRV, all of which are integrated, and further includes an output inductor L1, a backflow prevention diode (Schottky barrier diode) D1, an output capacitor C1, and resistances R1, R2, as elements to be mounted to external terminals T1, T2.

A drain of the transistor N1 is connected to the external terminal (switch terminal) T1. A source of the transistor N1 is grounded via the sense resistance Rs (several tens of mΩ).

The inverting input terminal (−) of the error amplifier AMP1 is connected to the external terminal (feedback terminal) T2. The non-inverting input terminal (+) of the error amplifier AMP1 is connected to a positive pole end of the DC voltage supply E1. The negative pole end of the DC voltage supply E1 is grounded.

The non-inverting input terminal (+) of the amplifier AMP2 is connected to one end (power supply side) of the sense resistance Rs and the inverting input terminal (−) is connected to the other end (grounding side) of the sense resistance Rs.

One input terminal of the adder ADD is connected to an output terminal of the amplifier AMP2 and the other input terminal is connected to a first output terminal (chopping wave voltage output terminal) of the oscillator OSC.

The non-inverting input terminal (+) of the PWM comparator PCMP is connected to an output terminal of the adder ADD. A first inverting input terminal (−) of the PWM comparator PCMP is connected to an output terminal of the error amplifier AMP1. A second inverting input terminal (−) of the PWM comparator PCMP is connected to an output terminal of the soft start circuit SS.

A set input terminal (S) of the flip-flop FF is connected to a second output terminal (clock output terminal) of the oscillator OSC. A reset input terminal (R) of the flip-flop FF is connected to an output terminal of the PWM comparator PCMP. An output terminal (Q) of the flip-flop FF is connected to a gate of the transistor N1 via the driver circuit DRV.

The external terminal T1 is connected to an output terminal of the battery 1 (battery voltage Vbat) via the output inductor L1 (several µH) outside the system regulator 2 and is also connected to an anode of the backflow prevention diode D1. Cathode of the backflow prevention diode D1 is connected, as an output terminal of the positive voltage step-up circuit 2P, to input terminal of the first regulator 21 (not shown in FIG. 2) and is also grounded via the output capacitor C1 (several tens µH). An output terminal of the positive voltage step-up circuit 2P is also grounded via the resistances R1, R2. Additionally, a connection node of the resistances R1, R2 is connected to the external terminal T2 of the system regulator 2.

In other words, the positive voltage step-up circuit 2P including the above-mentioned arrangement is a voltage step-up type DC/DC converter for obtaining a desired positive step-up voltage VP from the drain of the transistor N1 connected between two potentials (between battery voltage Vbat and grounding voltage GND), each as a different switching element. As for a driving method thereof, a peak current mode control method is used which executes a driving control of the transistor N1 based on the results of the monitoring of driving current flowing through the transistor N1 as well as the results of the monitoring of the output voltage VP.

Figure 3:
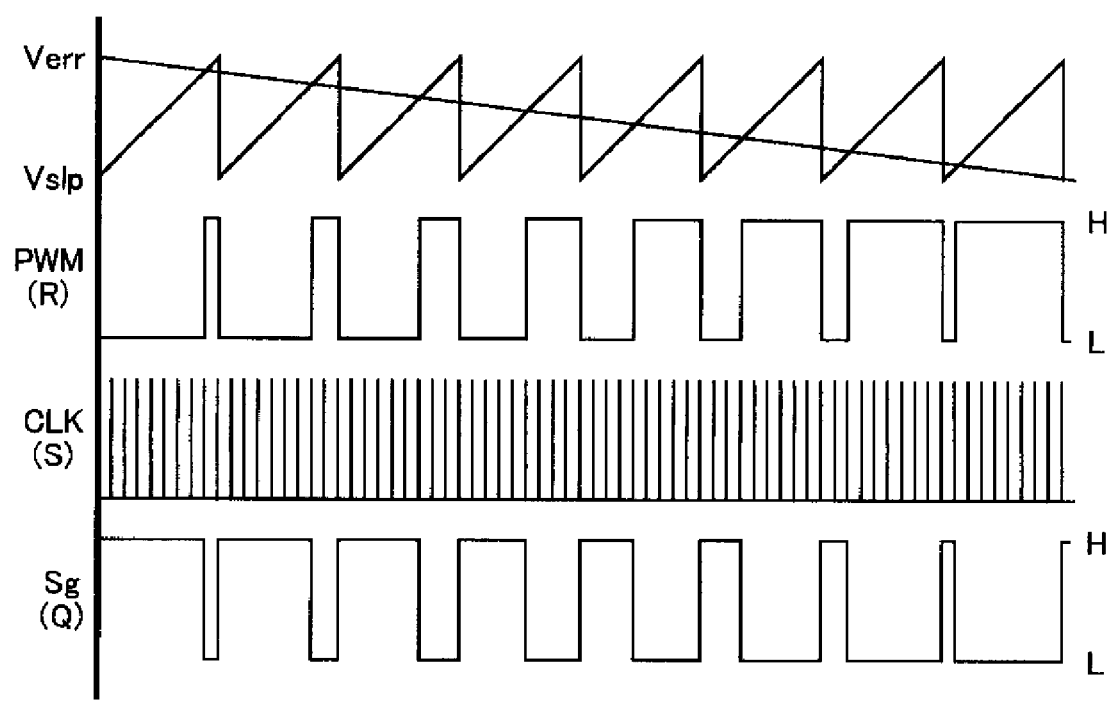
FIG. 3 is a drawing explaining PWM operations (steady state) of a positive voltage step-up circuit.

PWM operations (steady state of positive increasing voltage VP) of the positive voltage step-up circuit 2P including the above-mentioned arrangement will be explained in detail with reference to FIG. 3.

The error amplifier AMP1 generates an error voltage Verr by amplifying a voltage difference between a reference voltage Vref applied to the non-inverting input terminal (+) (electromotive voltage of DC voltage supply E1) and feedback voltage Vfb applied to the inverting input terminal (−) (divided voltage of a positive step-up voltage VP). More specifically, the higher the difference between the positive step-up voltage VP and its target value, the higher the level the error voltage Verr becomes.

The PWM comparator PCMP compares error voltage Verr applied to the first inverting input terminal (−) or soft start voltage Vss applied to the second inverting input terminal, whichever is lower, with slope voltage Vslp (output voltage of the adder ADD which is a sum of the reference chopping wave voltage of oscillator OSC and the output voltage of amplifier AMP2) applied to the non-inverting input terminal (+), and generates a PWM signal of duty depending on the result of the comparison. That is, while positive increasing voltage VP is in a steady state (after error voltage Verr becomes lower than the soft start voltage Vss, i.e., after termination of soft start duration), the logic of the above-mentioned PWM signal becomes low-level if error voltage Verr is higher than slope voltage Vslp, and becomes high-level if it is lower than Vslp.

While the PWM signal (reset signal of the flip-flop FF) is considered to be at a low-level, a gate signal Sg of the transistor N1 is held at a high-level at the rising of clock signal CLK (several hundreds kHz to several MHz) to be applied to set terminal (S) of the flip-flop FF. Therefore, the transistor N1 is put into an ON state. Additionally, while the PWM signal is considered to be at a high-level, the gate signal Sg is held at a low-level regardless of the clock signal CLK. Therefore, the transistor N1 is put into an OFF state.

As described above, with positive voltage step-up circuit 2P of a peak current mode control method, driving controls of the transistor N1 are carried out based on results of the monitoring of a driving current flowing through the transistor N1 as well as results of the monitoring of the output voltage VP. Therefore, with the positive voltage step-up circuit 2P according to the present preferred embodiment, since it is possible to directly control driving of the transistor N1 according to the results of the monitoring of a driving current flowing through the transistor N1 even if error voltage Verr is unable to follow steep load fluctuations, it eventually becomes possible to minimize fluctuations of positive increasing voltage VP. More specifically, with positive voltage step-up circuit 2P according to the present preferred embodiment, since there is no need for a significant increase in capacity of the output capacitor C1, it is also possible to avoid an unwanted increase in the cost or size of the capacitor C1.

Additionally, since the positive step-up voltage VP is zero immediately after the positive voltage step-up circuit 2P is started, the error voltage Verr becomes excessively high. Therefore, when the PWM signal is generated in accordance with results of the comparison between the error voltage Verr and the slope voltage Vslp, its duty becomes excessive and a large current may eventually flow through the output inductance L1.

Figure 4:
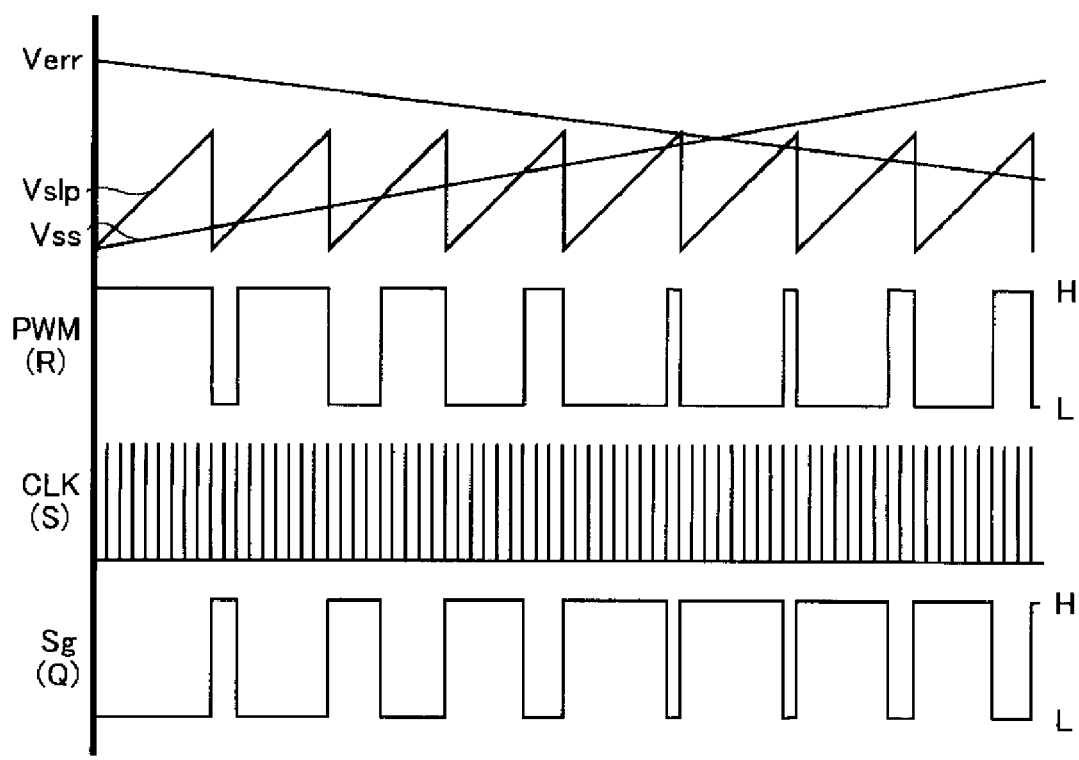
FIG. 4 is a drawing explaining PWM operations (starting) of a positive voltage step-up circuit.

In order to circumvent this problem, the positive voltage step-up circuit 2P according to the present preferred embodiment has, as mentioned previously, such an arrangement that apart from error voltage Verr, soft start voltage Vss, that allows gradual rising after supplying power, is input in advance to the PWM comparator PCMP, and when the soft start voltage Vss is lower than error voltage Verr, duty of the PWM signal is determined in accordance with the results of the comparison between the lower soft start voltage Vss and slope voltage Vslp without depending on the error voltage Verr (see FIG. 4).

Figure 5:
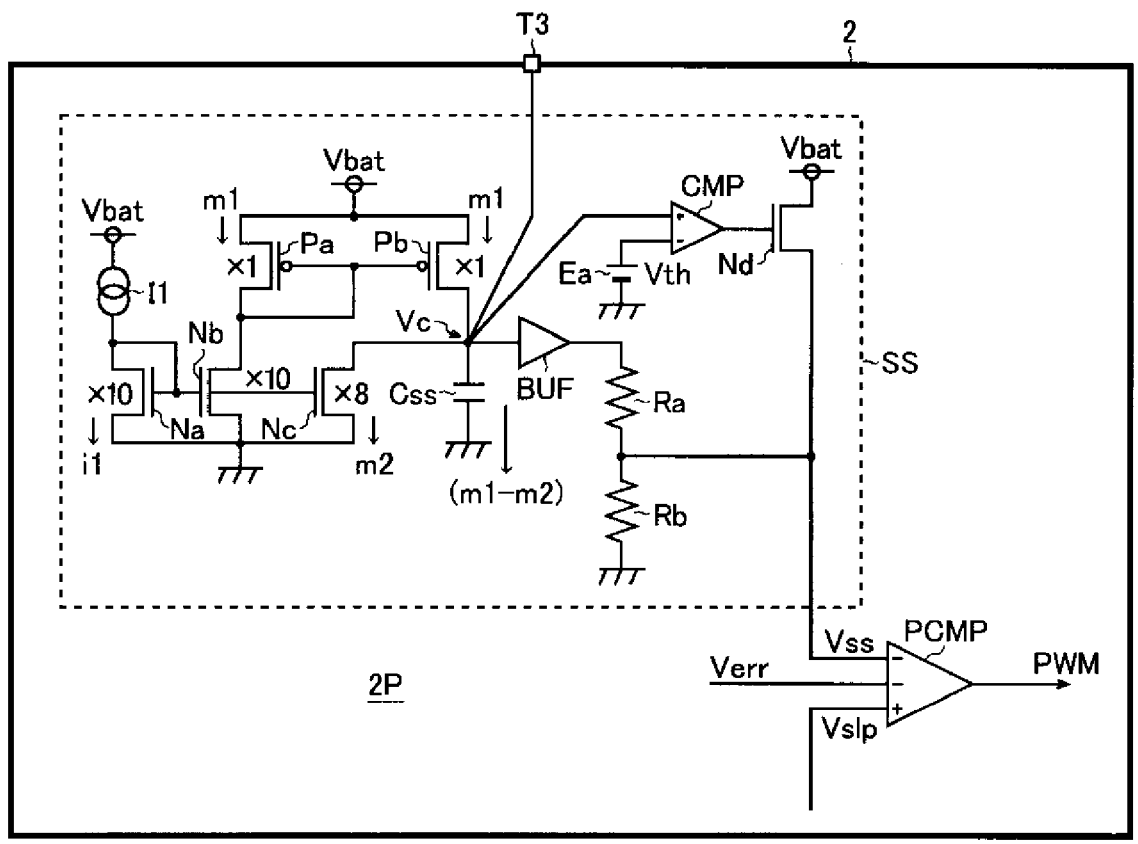
FIG. 5 is a circuit diagram showing one example of an arrangement of a soft start circuit.
Figure 6A:
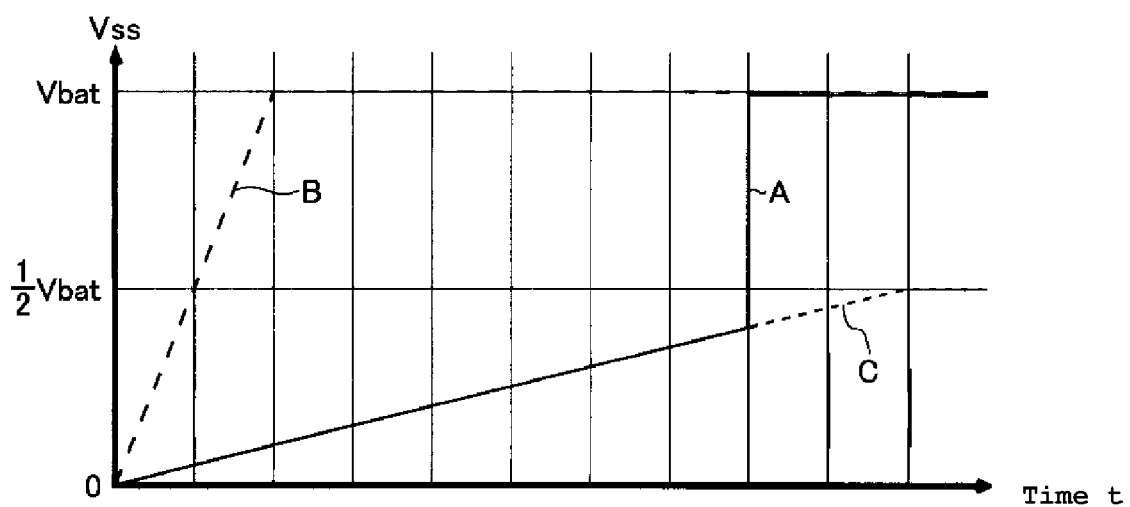
FIGS. 6A and 6B are drawings explaining operations of the soft start circuit shown in FIG. 5.
Figure 6B:
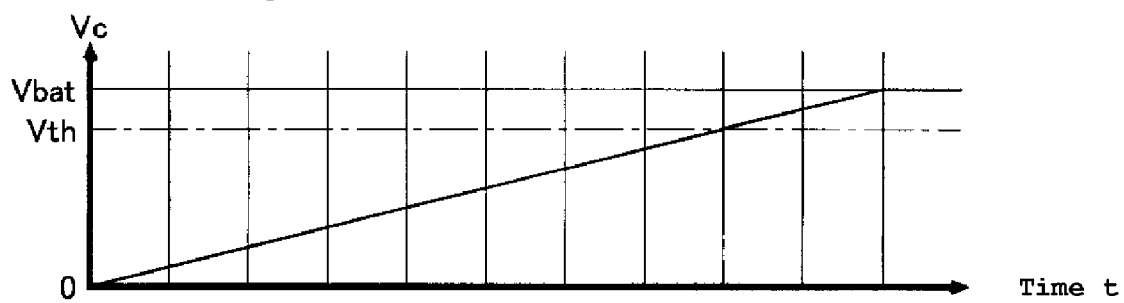
Figure 8:
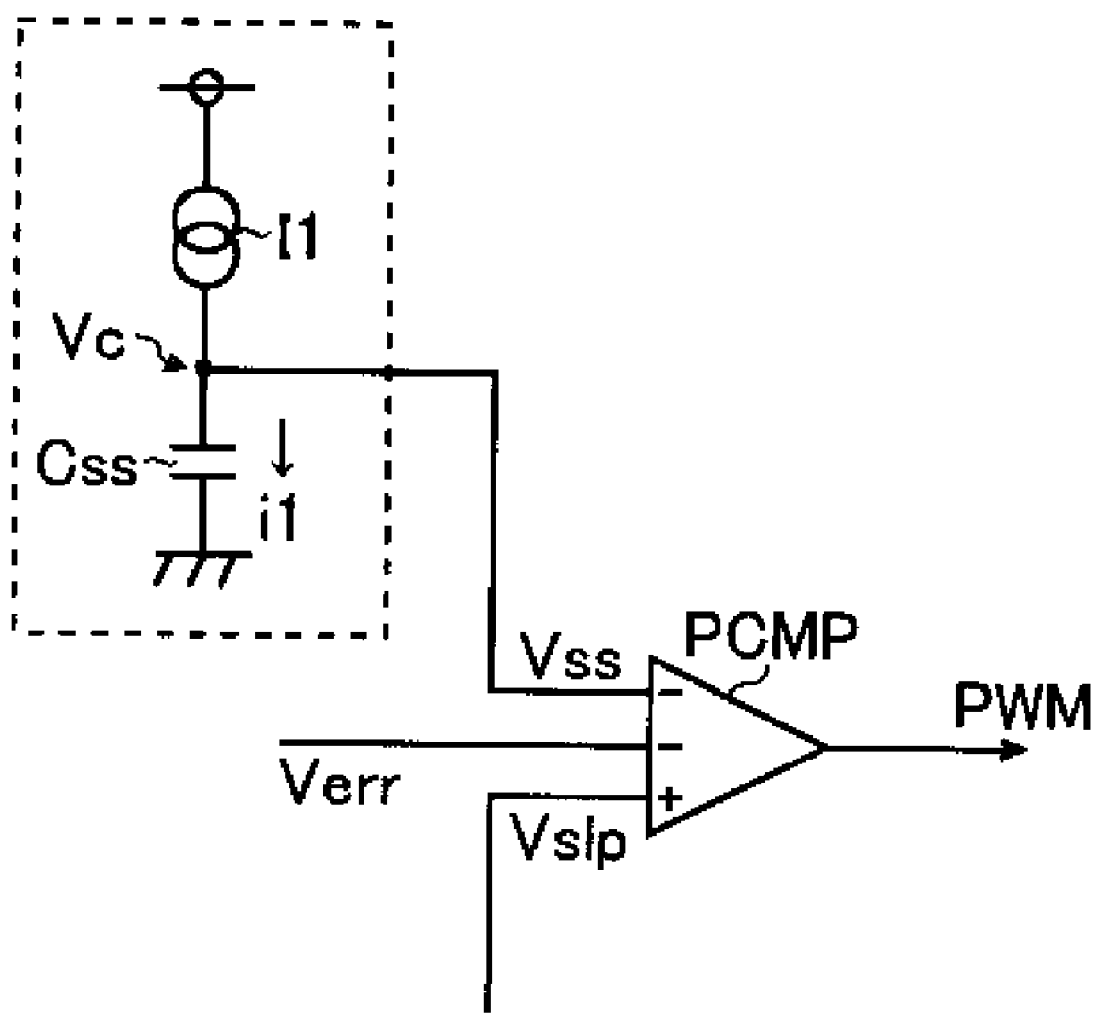
FIG. 8 is a circuit diagram showing one example of a conventional soft start circuit.

Referring to FIGS. 5, 6A, and 6B, the following description explains the arrangement and operations of the soft start circuit SS for generating soft start voltage Vss in detail. FIG. 5 is a circuit diagram showing one example of the arrangement of soft start circuit SS and FIGS. 6A and 6B are drawings explaining operations of the soft start circuit SS. The vertical axis in FIGS. 6A and 6B represents soft start voltage Vss and charging voltage Vc of the capacitor Css, respectively, and the lateral axis represents time t in both FIGS. 6A and 6B. In FIG. 6A, solid line A shows the voltage behavior in accordance with the preferred embodiments of the present invention, and dotted line B shows conventional voltage behavior (i.e., voltage behavior when the capacitance of capacitor Css is the same level as that of FIG. 5 and the conventional arrangement shown in FIG. 8 is utilized). Thin dotted line C shows voltage behavior for a case where there is no structure for pulling-up the soft start voltage Vss (comparator CMP, transistor Nd and DC voltage supply Ea), which will be described below.

As shown in FIG. 5, the soft start circuit SS according to another preferred embodiment preferably includes N-channel field effect transistors Na to Nd, p-channel field effect transistors Pa to Pb, a constant current source I1, a capacitor Css, a buffer BUF, resistances Ra and Rb, a comparator CMP, and a DC voltage supply Ea.

A drain of the transistor Na is connected to power supply line (battery voltage Vbat) via constant current source I1. A source of the transistor Na is grounded. A gate of the transistor Na is connected to a gate of transistors Nb, Nc and to its own drain as well. A drain of the transistor Nb is connected to a drain of the transistor Pa. A source of the transistor Nb is grounded. A drain of the transistor Nc is connected to one end of the capacitor Css. A source of the transistor Nc is grounded. Gate areas SNa to SNc of transistors Na to Nc are designed such that SNa:SNb:SNc=10:10:8.

Each source of transistors Pa, Pb is connected to the power supply line (battery voltage Vbat). Each gate of transistors Pa, Pb is connected each other and is also connected to a drain of the transistor Pa. A drain of the transistor Pb is connected to one end of the capacitor Css. Additionally, gate areas SPa, SPb of the transistors Pa, Pb are designed such that SPa:SPb=1:1.

One end of the capacitor Css is connected respectively to the input terminal of the buffer BUF, the non-inverting input terminal (+) of the comparator CMP, and the external terminal (test terminal) T3 in addition to each of drains of transistors Nc, Pb mentioned previously. The other end of the capacitor Css is grounded.

An output terminal of the buffer BUF is grounded via the resistances Ra, Rb. A connection node of the resistances Ra, Rb is connected to the second inverting input terminal (−) of the PWM comparator PCMP as an output terminal of the soft start circuit SS.

The inverting input terminal (−) of the comparator CMP is connected to the positive pole end of the DC voltage supply Ea. An output terminal of the comparator CMP is connected to a gate of the transistor Nd. A drain of the transistor Nd is connected to the power supply line (battery voltage Vbat). A source of the transistor Nd is connected to an output terminal of the soft start circuit SS.

As it is understood from above-mentioned description, the soft start circuit SS of this preferred embodiment includes a constant current source I1 for generating a predetermined constant current i1 (100 nA in this preferred embodiment), a first mirror current circuit (transistors Na to Nb, transistors Pa to Pb) for generating from the constant i1 a first mirror current m1 (same value as constant current i1 in this preferred embodiment), a second mirror current circuit (transistors Na, Nc) for generating from the constant current i1 a second mirror current m2 (80 nA in this preferred embodiment) that is smaller than the first mirror current m1, a capacitor Css into which electric current that is the difference between the second mirror current m2 and the first mirror current m1 (m1-m2) (20 nA in this preferred embodiment) is introduced, and a voltage dividing circuit (resistances Ra, Rb) for dividing charging voltage Vc of the capacitor Css, and has an arrangement such that a divided voltage generated by the voltage dividing circuit is output as the soft start voltage Vss.

In other words, the soft start circuit SS of this preferred embodiment has an arrangement such that, similar to the conventional arrangement shown in FIG. 8, constant current i1 of 100 nA and first mirror current m1 are generated in advance, second mirror current m2 of 80 nA is subtracted from the constant current i1 and first mirror current m1, a minute charging current of 20 nA is introduced into the capacitor Css, and charging voltage Vc obtainable at its one end is received by the buffer BUF and is then divided by the voltage driving circuit (Ra, Rb) to, for example, ½, thereby generating a desired soft start voltage Vss.

With such an arrangement, it is possible to reduce the rising inclination of the soft start voltage Vss to approximately ¹⁄₁₀ compared to the conventional arrangement (i.e., capacity of the capacitor Css is the same level as that of FIG. 5, and conventional arrangement of FIG. 8 is utilized) (see FIG. 6A) without causing a significant increase in the capacity of the capacitor Css (enlargement of the occupied area) and using a minute electric current of the constant current source I1 (deterioration of the accuracy). Therefore, it is possible to surely avoid large currents upon starting up of the device while soft start duration in the positive voltage step-up circuit 2P is sufficiently obtained.

The soft start circuit SS of the present preferred embodiment has an arrangement such that instead of generating constant currents m1, m2, which should be subtracted when generating a charging current to the capacitor Css, independently in a plurality of constant current sources, first mirror current m1 and second mirror current m2 which have a mutual relationship are generated by using first and second mirror current circuits which are based on sole constant current i1.

With such an arrangement, since a magnitude relationship between the first mirror current m1 and the second mirror current m2 is hardly reversed even if there are variations in manufacturing of the circuit elements, which is different from the case where a plurality of constant current sources are used, it is possible to reduce the possibility of occurrence of the device not starting up at all.

Additionally, since the soft start circuit SS of this preferred embodiment has such an arrangement that for the sake of attaining a more gradual rising inclination of charging voltage Vc, a divided voltage reduced to ½ of its charging voltage Vc is output as the soft start voltage Vss and therefore, increasing of the voltage level thereof is eventually up to ½ of battery voltage Vbat (1.5 V at the maximum, see thin dotted line C in FIG. 6A). Accordingly, when battery voltage Vbat is reduced due to draining of the battery 1, soft start voltage Vss becomes less than error voltage Verr even though the device is in steady state (other than starting), and feedback operation thereof may be hindered.

The soft start circuit SS of this preferred embodiment includes, as a means for eliminating above-mentioned problem (i.e., for pulling-up of the soft start voltage Vss), a comparator CMP for comparing charging voltage Vc of the capacitor Css and a predetermined threshold voltage Vth (same as that of battery voltage Vbat in this preferred embodiment, or a voltage level slightly lower than that, see FIG. 6B), a transistor Nd which is inserted between the power supply line (battery voltage Vbat) and output terminal of the voltage dividing circuit (Ra, Rb) and is ON/OFF controlled depending on the output logic of the comparator CMP.

With such an arrangement, after the soft start operation has been completed, it is possible to pull-up the soft start voltage Vss up to battery voltage Vbat. Therefore, even if battery voltage Vbat is low, it is possible to eliminate such a trouble that soft start voltage Vss may cause hindrance to feedback operation of the positive voltage step-up circuit 2P.

As the threshold voltage Vth mentioned above, any voltage level which is able to show a timing positively eliminating soft start operation may be used and, for example, it may be the upper limit voltage of the slope voltage Vslp or to a voltage slightly higher than that.

The soft start circuit SS of this preferred embodiment includes an external terminal T3 connected to one end of the capacitor Css for evaluation purposes of the system regulator 2. With this arrangement, if there is no problem with the soft start circuit SS, the first mirror current m1 (for example, 100 nA) should be measured by connecting the external terminal T3 to GROUND and conversely, the second mirror current (for example, 80 nA) should be measured by increasing the external terminal T3 to battery voltage Vbat. That is, as long as the evaluation method which uses external terminal T3 is utilized, evaluation of the system regulator 2 can be performed by measuring a comparatively large electric current, such as first and second mirror currents m1, m2, instead of measuring an absolute value as low as 20 nA.

Although, in the preferred embodiments described above, explanation is given for a case where the present invention is applied to positive voltage step-up circuit 2P of a peak current mode control type, the present invention is not limited thereto, and it should be noted that the present invention can be applied to all levels of DC stabilized power supply units which generate from an input voltage a desired output voltage.

Figure 7:
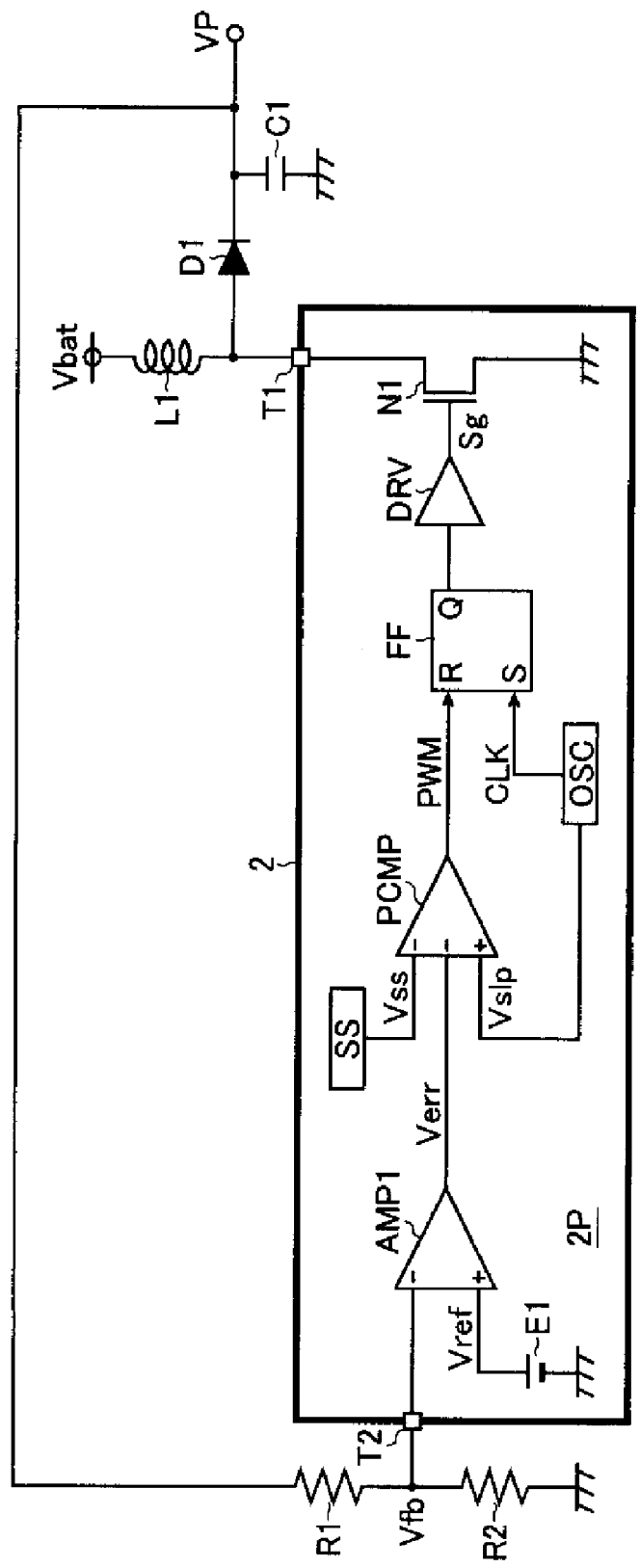
FIG. 7 is a circuit diagram showing one example of an alternative arrangement of the positive voltage step-up circuit.

For example, as shown in FIG. 7, when the soft start circuit SS as shown in FIG. 5 is provided to an ordinary DC stabilized power supply unit which includes an error amplifier AMP1 for amplifying a voltage difference between feedback voltage Vfb which varies depending on the output voltage VP and a predetermined reference voltage Vref and performs switching controls of the output transistor N1 using an output signal (error voltage Verr) of the error amplifier AMP1, it is possible to obtain the same benefits as mentioned above.

Further, in addition to above-mentioned preferred embodiments, various modifications can be applied to the arrangements of the present invention without departing from the scope of the present invention.

For example, in the above-mentioned preferred embodiment, although explanation is given referring to an arrangement including voltage dividing circuits (Ra, Rb) for dividing charging voltage Vc of the capacitor Css and outputting a divided voltage generated by the voltage dividing circuit as soft start voltage Vss, the present invention is not limited thereto, and an arrangement that directly outputs a charging voltage of the capacitor Css as soft start voltage Vss may be used.

Additionally, in the above-mentioned preferred embodiments, although a case where a Schottky barrier diode alone is used as the backflow prevention diode D1, ordinary diodes may be used or, alternatively, may be omitted if a synchronous rectification switch circuit is added.

Further, a circuit in which a P channel and an N channel of a transistor are reversed may be used.

Additionally, a discharging circuit for capacitor Css may be preferably provided.

Further, transistor N1 and sense resistance Rs may be provided externally or resistances R1, R2 may be built in.

The present invention is a technology preferably used in an application which needs to secure a sufficient soft start duration and to surely avoid a large current during starting of a device (e.g., DC stabilized power supply unit of a peak current mode control method with good response against load variations, power supply unit of equipment using battery, or the like).

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A soft start circuit comprising:
a first constant current source arranged to generate a first constant current;
a second constant current source arranged to generate a second constant current smaller than the first constant current; and
a capacitor into which an electric current that is a difference between the second constant current and the first constant current is introduced; wherein
a charging voltage at one end of the capacitor is output as a comparison voltage for a soft start.

2. A soft start circuit comprising:
a constant current source arranged to generate a constant current;
a first mirror current circuit arranged to generate from the constant current a first mirror current;
a second mirror current circuit arranged to generate from the constant current a second mirror current smaller than the first mirror current; and
a capacitor into which an electric current that is a difference between the second mirror current and the first mirror current is introduced; wherein
a charging voltage at one end of the capacitor is output as a comparison voltage for a soft start.

3. The soft start circuit according to claim 1, further comprising a voltage dividing circuit arranged to divide a charging voltage of the capacitor and output a divided voltage generated by the voltage dividing circuit as a comparison voltage for the soft start.

4. The soft start circuit according to claim 3, further comprising a comparator arranged to compare a charging voltage of the capacitor with a predetermined threshold voltage, and a switch element inserted between a power supply line and an output terminal of the voltage dividing circuit and being ON/OFF controlled according to an output logic of the comparator, wherein the switch element is shifted to an ON state when a charging voltage of the capacitor exceeds the predetermined threshold voltage.

5. The soft start circuit according to claim 1, further comprising an external terminal connected to one end of the capacitor.

6. A power supply unit comprising:
an output transistor arranged to generate from an input voltage an output voltage depending on ON/OFF control;
an error amplifier arranged to generate an error voltage by amplifying a difference between a feedback voltage depending on the output voltage and a predetermined reference voltage;
a soft start circuit according to claim 1 arranged to generate a comparison voltage for a soft start which starts rising after supplying power;
a PWM comparator arranged to generate a PWM signal of a duty depending on a result of comparing the lower of the error voltage or comparison voltage for the soft start with a predetermined slope voltage; and
a controller arranged to ON/OFF control the output transistor using the PWM signal.

7. The power supply unit according to claim 6, further comprising an inductor having one end connected to an applied end of the input voltage and the other end connected to one end of the output transistor, a diode having an anode connected to one end of the output transistor and a cathode connected to a taking-out end of the output voltage, and a capacitor having one end connected to the taking-out end of the output voltage and the other end connected to an applied end of a reference voltage, wherein the output voltage is generated by stepping-up the input voltage.

8. An electric equipment comprising:
a battery that serves as a power supply and a power supply unit that is an output conversion of the battery; wherein
the power supply unit includes the power supply circuit according to claim 6.

9. The soft start circuit according to claim 2, further comprising a voltage dividing circuit arranged to divide a charging voltage of the capacitor and output a divided voltage generated by the voltage dividing circuit as a comparison voltage for the soft start.

10. The soft start circuit according to claim 9, further comprising a comparator arranged to compare a charging voltage of the capacitor with a predetermined threshold voltage, and a switch element inserted between a power supply line and an output terminal of the voltage dividing circuit and being ON/OFF controlled according to an output logic of the comparator, wherein the switch element is shifted to an ON state when a charging voltage of the capacitor exceeds the predetermined threshold voltage.

11. The soft start circuit according to claim 2, further comprising an external terminal connected to one end of the capacitor.

12. A power supply unit comprising:
- an output transistor arranged to generate from an input voltage an output voltage depending on ON/OFF control;
- an error amplifier arranged to generate an error voltage by amplifying a difference between a feedback voltage depending on the output voltage and a predetermined reference voltage;
- a soft start circuit according to claim 2 arranged to generate a comparison voltage for a soft start which starts rising after being supplied with power;
- a PWM comparator arranged to generate a PWM signal of a duty depending on a result of comparing the lower of the error voltage or comparison voltage for the soft start with a predetermined slope voltage; and
- a controller arranged to ON/OFF control the output transistor using the PWM signal.

13. The power supply unit according to claim 12, further comprising an inductor having one end connected to an applied end of the input voltage and the other end connected to one end of the output transistor, a diode having an anode connected to one end of the output transistor and a cathode connected to a taking-out end of the output voltage, and a capacitor having one end connected to the taking-out end of the output voltage and the other end connected to an applied end of a reference voltage, wherein the output voltage is generated by stepping-up the input voltage.

14. An electric equipment comprising:
- a battery that serves as a power supply and a power supply unit that is an output conversion of the battery; wherein
- the power supply unit includes the power supply unit according to claim 12.

* * * * *